(12) United States Patent
Dillat

(10) Patent No.: US 7,110,654 B2
(45) Date of Patent: Sep. 19, 2006

(54) ARRAY OF FIBER OPTIC SPLICING CASSETTES

(75) Inventor: Michel Dillat, Becon (FR)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/682,272

(22) Filed: Oct. 9, 2003

(65) Prior Publication Data

US 2004/0120680 A1 Jun. 24, 2004

Related U.S. Application Data

(60) Provisional application No. 60/419,037, filed on Oct. 15, 2002, provisional application No. 60/418,149, filed on Oct. 11, 2002.

(51) Int. Cl.
G02B 6/00 (2006.01)
(52) U.S. Cl. .................................................. 385/135
(58) Field of Classification Search ........ 385/134–147, 385/53, 76–77
See application file for complete search history.

(56) References Cited

U.S. PATENT DOCUMENTS

| | | | |
|---|---|---|---|
| 4,824,196 A | | 4/1989 | Bylander |
| 4,900,123 A | | 2/1990 | Barlow et al. |
| 5,119,459 A | * | 6/1992 | Meyerhoefer et al. ...... 385/135 |
| 5,421,532 A | | 6/1995 | Richter |
| 5,506,927 A | | 4/1996 | Kitajima et al. |
| 5,631,993 A | * | 5/1997 | Cloud et al. ................ 385/135 |
| 5,717,811 A | * | 2/1998 | Macken ........................ 385/135 |
| 5,887,106 A | | 3/1999 | Cheeseman et al. |
| 6,097,872 A | | 8/2000 | Kusuda et al. |
| 6,282,360 B1 | | 8/2001 | Milanowski et al. |
| 6,304,707 B1 | * | 10/2001 | Daems et al. ................ 385/135 |
| 6,360,050 B1 | | 3/2002 | Moua et al. |
| 6,707,978 B1 | | 3/2004 | Wakileh et al. |
| 6,741,785 B1 | | 5/2004 | Barthel et al. |
| 2004/0120681 A1 | | 6/2004 | Bohle et al. |

FOREIGN PATENT DOCUMENTS

| | | |
|---|---|---|
| EP | 0 466 668 A2 | 1/1992 |
| EP | 0 689 074 A1 | 12/1995 |
| FR | 2 678 076 A1 | 12/1992 |
| GB | 2 254 194 A | 9/1992 |
| JP | 2002-236219 | 8/2002 |
| WO | WO 94/23324 | 10/1994 |
| WO | WO 95/07481 | 3/1995 |
| WO | WO 95/07486 | 3/1995 |
| WO | WO 95/09375 | 4/1995 |
| WO | WO 02/19005 A2 | 3/2002 |

* cited by examiner

*Primary Examiner*—Javaid H. Nasri
(74) *Attorney, Agent, or Firm*—John A. Burtis; James J. Trussell

(57) ABSTRACT

An array of fiber optic splicing cassettes. The array has first and second side plates connected to one another by first and second axes. The fiber optic splicing cassettes each have a base and first and second curved slots in the base. Each of the first slots is moveably engaged on the first axis, and each of the second slots is moveably engaged on the second axis. In this way each of the cassettes may be moved between an open position and a closed position by simultaneously moving the first and second slots in one of the cassettes relative to the first and second axes.

20 Claims, 8 Drawing Sheets

ARRAY OF FIBER OPTIC SPLICING CASSETTES

CROSS-REFERENCE TO RELATED APPLICATION

This application claims priority to U.S. Provisional Patent Application No. 60/419,037, filed Oct. 15, 2002 and U.S. Provisional Patent Application No. 60/418,149, filed Oct. 11, 2002.

TECHNICAL FIELD

The invention relates to a system that allows the management or organization of optical fibers to be used in an optical fiber telecommunication network. It relates more particularly to a system of cassettes allowing the organization of optical fibers including splices. The invention further relates to manufacturing techniques for those cassettes.

BACKGROUND OF THE INVENTION

The use of optical fibers has become more and more dominant in the telecommunication field. This results in a growing number of optical fibers to be handled, especially to be spliced and connected and distributed, and therefore systems for the management or organization of optical fibers are used to a growing extent. It is necessary to have an optimum organization of the fibers and furthermore the capabilities to conduct modifications and changes in a controlled manner whereby these changes should preferably be carried out so that if at all possible only those optical fibers that have to be changed and modified are moved while all other optical fibers essentially remain untouched so that undesired disturbances are avoided. This is particularly important since in the telecommunication area to a growing extent data are transmitted besides the pure transmission of voice signals, and interference with or interruption of these signals would be very disadvantageous.

These systems for the management or organization of the optical fibers are typically used in central office locations and are placed into modular optical distribution frames or racks, typically 483.6 mm (19 inch) racks.

Usually a large number of protected optical fibers enter the distribution frame or rack and have to be distributed, which can be achieved by splicing. The ends of the incoming optical fibers are spliced to individual optical fibers of a short length, the other end of which is already connected to an optical connector. The two ends are spliced together with well-known techniques and the excess length is arranged in specially designed cassettes, which typically contain a certain number of optical fibers. The further distribution is then achieved through a connection to another position in the entire distribution network through the equivalent of so-called jumper fibers.

Due to the high number of connections to be established, and the limited number of connections to be made within each cassette, it is necessary to use a large number of these cassettes. WO 95/07481 and WO 94/23324 present examples of arrays of cassettes. WO 95/07481, in particular, shows the way the fibers may be handled and distributed. Typically the cassettes are placed on rails or racks into which they are placed side by side so that they can be moved at a certain angle. This allows one to flip the cassettes like pages of a book so that any desired individual cassette can be reached in order to achieve any kinds of modifications. These can be the addition of new connections or the change of connections, a repair and the like. These systems are widely in use but it was recognized that they present some problems. For example, when choosing a certain cassette to be accessed, a high number of other cassettes must be moved, which as mentioned above results in the undesirable movement of a fairly large number of optical fibers. As also stated above, this becomes more and more critical because a pure voice signal data transmission is becoming more and more important, and bit errors are getting more and more critical. In other words, moving fibers can cause signal transmission errors.

Attempts have been made to overcome this problem, as described in WO 95/09375 and WO 95/07486. Here an arrangement is used in which the cassettes are arranged on top of each other or in a side by side arrangement, however, this is achieved so that they are fixed together through typically a common axis and the systems are designed so that an individual cassette can be moved out of the stack around the common axis so that this individual cassette becomes accessible for the above described needs. The advantage of this solution is that all fibers in the other cassettes are completely untouched and thus undisturbed. However, all of the fibers within the cassette that is moved also move, because the fibers do not pass directly by the common axis and therefore changes are unavoidable. Furthermore it is not always possible to obtain a complete access to the entire cassette in systems such as the ones described.

FR 2 789 497 shows a configuration in which the cassettes are arranged in a similar manner with a common axis, however, the cassette is provided with a curved slot, which simultaneously allows a rotation of the cassette and a longitudinal movement so that better access is obtained. This longitudinal movement depends on the specific construction and is not pre-determined. Products as described in FR 2 789 498 are believed to be available from the NEXANS Company of Bezon Cedex 95872, France.

SUMMARY OF THE INVENTION

In one aspect of the invention, it includes an array of cassettes for the management or organization of optical fibers, in which each cassette has a width and a length that is larger than the width, and a thickness that is smaller than the width. The cassettes are arranged between two side plates, which are connected to each other by spacers that are spaced apart by a given distance. The cassettes are provided with at least two curved slots, the first one being arranged towards a first longitudinal end of the cassette, and the second one being arranged further inside the cassette and being longer than the first slot. The cassettes are mounted between the two side plates so that the two spacers pass through the slots. These slots are essentially curved and so designed that an individual cassette can be moved out of the stack whereby it is rotated at the first longitudinal end and simultaneously lifted out of the stack in a direction, which is perpendicular to the longitudinal direction of the cassette.

One advantage of this configuration is that the individual cassette can be moved out of the stack and access provided to the fibers, with a rotation, which is no more than 90° and preferably no more than 60°. The simultaneous shift out of the stack provides access without movement of the fibers in their longitudinal direction, and as a result no additional fiber length has to be provide or stored for this movement, and no problems occur due to fiber stresses because of the cassette movement. In this way the fibers in a cassette can be also accessed without disturbing the fibers in adjacent cassettes.

In one configuration, the cassette is designed so that the incoming and outgoing fibers pass into the cassette close to the ends of the curved slots and at the first longitudinal end of the cassette. In this case the fibers are only bent at an angle in the order of 60–90°. With the dimensions of the cassette this bending occurs at a relatively large radius that is in the order of magnitude of the width of the cassette. Typically the bending radius is larger than the bending radii within the cassette.

The number of the cassettes between the outer plates is preferably relatively small, ranging between 6 and 12. However, the invention is not limited thereto. Any other number is possible provided that the spacers between the side plates are stable enough. The system comprising the stack of cassettes is preferably produced through conventional molding processes. Furthermore, it may be advantageous for the user to utilize cassettes of different thicknesses depending on the specific application.

In another embodiment, the first longitudinal end of the cassettes are provided with two pairs of curved slots—two first ones and two longer second ones which are symmetrically arranged with respect to the longitudinal dimension of the cassette. In a typical application a stack of cassettes is arranged so that they are placed so that when opening the cassette the fibers can be accessed from the top. It is therefore normally desirable to have arrangements that are rotated around axes that are arranged on the right side or left side of the array when standing in front of it. The configuration with two pairs of axes allows stacks of cassettes to be arranged between the two side plates so that the axis configuration is either on the left side or the right side when arranging the stack, so that in the practical use the cassettes are accessed from the top.

In such an arrangement of two pairs of curved slots it is usually necessary to arrange them so that at least two of them cross each other. In order to avoid an undesired movement or blocking of the cassette, a blocking device may be placed into the one of the second slots that in the specific configuration is not used. In another embodiment, blocking device is integrally molded with the cassette, so that it can be easily broken off from the cassette for use as described herein. In one configuration this blocking device can be broken off so that two small pins left over at the longitudinal end of the cassette are arranged so that they face each other, so that they can be used in order to arrange a cassette in the conventional orientation where individual cassettes are moved over each other like pages in a book. This is of course not a preferred configuration but the advantage is that the cassettes could also be utilized in a conventional side-by-side arrangement where the cassettes are moved with respect to each other.

Although the cassettes illustrated herein are of relatively uniform dimension, cassettes of different thicknesses may be used as well, which is advantageous if more or less splices are expected to be used within a cassette.

In another preferred configuration at least one end, preferably both ends, of the second longer slot is designed with a flexible portion that provides a snapping of the cassette at the spacer when the cassette is completely opened.

Preferably the splicing area is arranged in the middle portion of the cassette. It can include two longitudinal fingers arranged along the longitudinal direction of the cassette to hold down the optical fibers. Furthermore it is preferable to have an arrangement in the middle of the cassette, which allows the fixing of the splices in a preferred configuration. It is possible to arrange inserts within the molding tool that in the middle portion of the cassette can provide a varying number of splices to be located, for example 2, 4, or 6, or even more if desired for any reason. Alternatively the cassette can build up from separate parts that are individually molded and joined together afterwards.

Furthermore it is preferable to guide both the incoming and the outgoing fiber into the cassette on the same side namely the one that is closest to the two axes. This requires that one of the fibers has to be turned around at an angle of more than 180° so that it can be spliced together with the other fiber, which is directly guided to the middle portion where the splicing takes place. The middle portion can be provided with grooves or other configurations allowing to fix the splice, the grooves or other configurations preferably being arranged at an angle, which could range between 30° and 60° which would facilitate the guidance of the fibers. Furthermore, in the embodiments, which comprise two pairs of curved slots, it is advantageous to have two of these arrangements, which cross each other at an angle. In this case only those grooves are used which show into the direction from which the fibers are coming from the outside. This allows to use the cassettes with their axes either arranged on the left or the right side as described above.

Other aspects of the invention include cassettes as described above in combination with a rack, single cassettes, and other such arrangements.

BRIEF DESCRIPTION OF THE DRAWINGS

The present invention will be described with reference to the attached Figures in which.

DETAILED DESCRIPTION OF THE INVENTION

Figure 1:
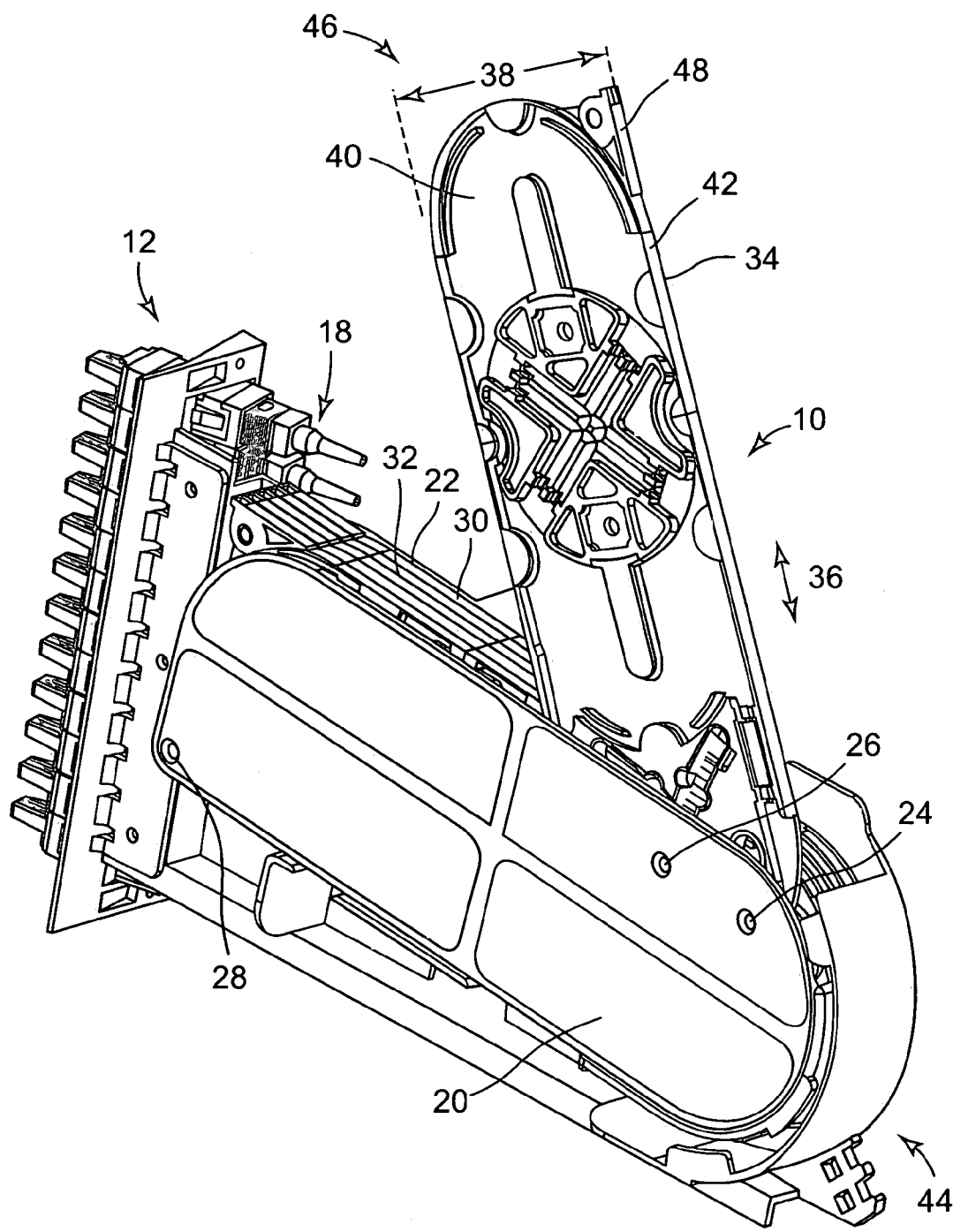
FIG. 1 shows an array with a stack of cassettes for the management or organization of optical fibers arranged between two side plates, according to the present invention.
Figure 2:
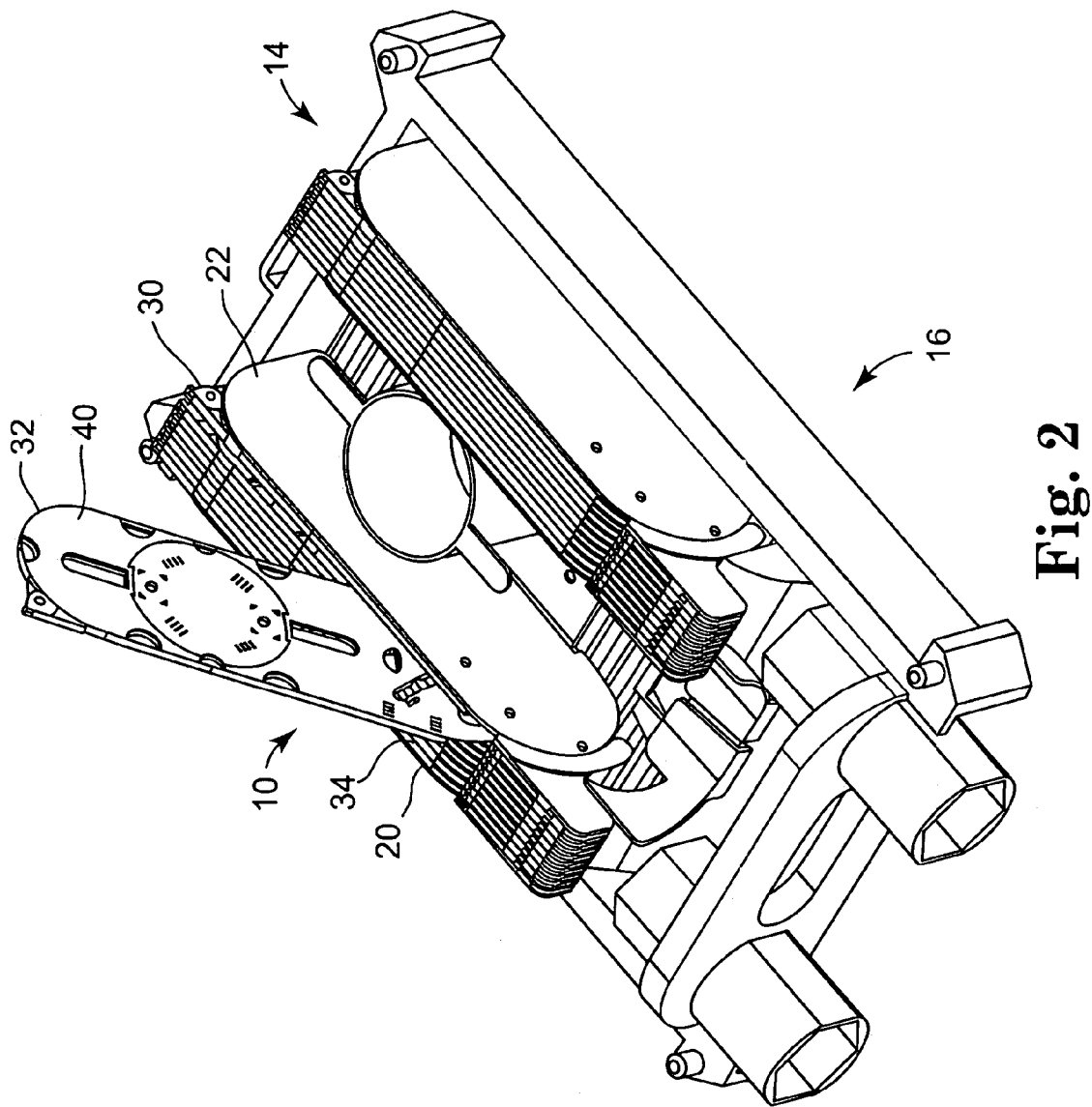
FIG. 2 shows two arrays with cassettes of a similar arrangement jointly placed into a common housing, according to the present invention.

Arrays of cassettes for the management of optical fibers can be seen in FIGS. 1 and 2. In FIG. 1 the array 10 is mounted into an assembly 12, which is supposed to be placed onto a modular optical distribution frame (MODF) or a 483.6 mm (19 inch) rack or the like. FIG. 2 shows the same array 10 and a second array of the same kind 14 arranged in a common holding device 16 that for example can be part of a splice body for the splicing of two cables containing a multiplicity of optical fibers. FIG. 1 shows on the left side a multiplicity of fiber optic connectors 18, the fibers (not shown) are guided into the array of cassettes 10 to be spliced with incoming fibers. This is generally well known and therefore no further reference will be made to the specific embodiments of the array of cassettes 10, 14 in the environments as shown in FIGS. 1 and 2.

In the following reference will only be made to the array of cassettes utilizing the same numerals as in FIGS. 1 and 2. The array consists of two side plates 20, 22 that are fixedly held together with three spacers, axes or rods 24, 26, and 28, which will be explained in further detail below. Between these outer plates 20, 22 six cassettes for the management of the optical fibers are placed, which also will be explained in further detail in conjunction with the description for FIG. 3, although only three of them 30, 32, and 34 are referred to. In FIG. 1 the cassette 34 next to the side plate 20 is moved out of the array while in FIG. 2 the second cassette 32 close to side plate 22 is moved out while the cassette 30, which is next to the side plate 22, is left in the array.

The following describes the characteristics of the individual cassette 34, but is typically true for all cassettes within the array. This cassette has a longitudinal dimension or length, which is indicated by the double arrow 36, and a width 38. The length is greater than the width 38. The cassette includes a base plate 40 and is at its circumference surrounded by an outer wall 42, which in the illustrated embodiment continues around the entire circumference with only some interruptions. This is a preferred configuration, because a relatively continuous outer wall provides maximum protection for the optical fibers. The height of wall 42 typically determines the thickness of the cassette 34. This thickness is typically, but not necessarily, significantly smaller than the width 38 and the length 36 of cassette 34. Cassette 34 is retained within the array by the axes 24, 26, which will be explained further in detail in conjunction with FIG. 3. This is achieved, so that is possible that cassette 34 like all the other cassettes can be moved out of the array by pushing the first longitudinal end 44. Cassette 34 can be also moved out of the array at the second longitudinal end 46 utilizing a handle like configuration of some kind 48, or by any other manner of grasping the cassette. If a handle 48 is provided, the handle is preferably provided with means for marking of some kind of indicia, preferably including at least a number or the like, so that is possible to identify the cassette that is supposed to be opened to access the appropriate fibers.

Figure 3:
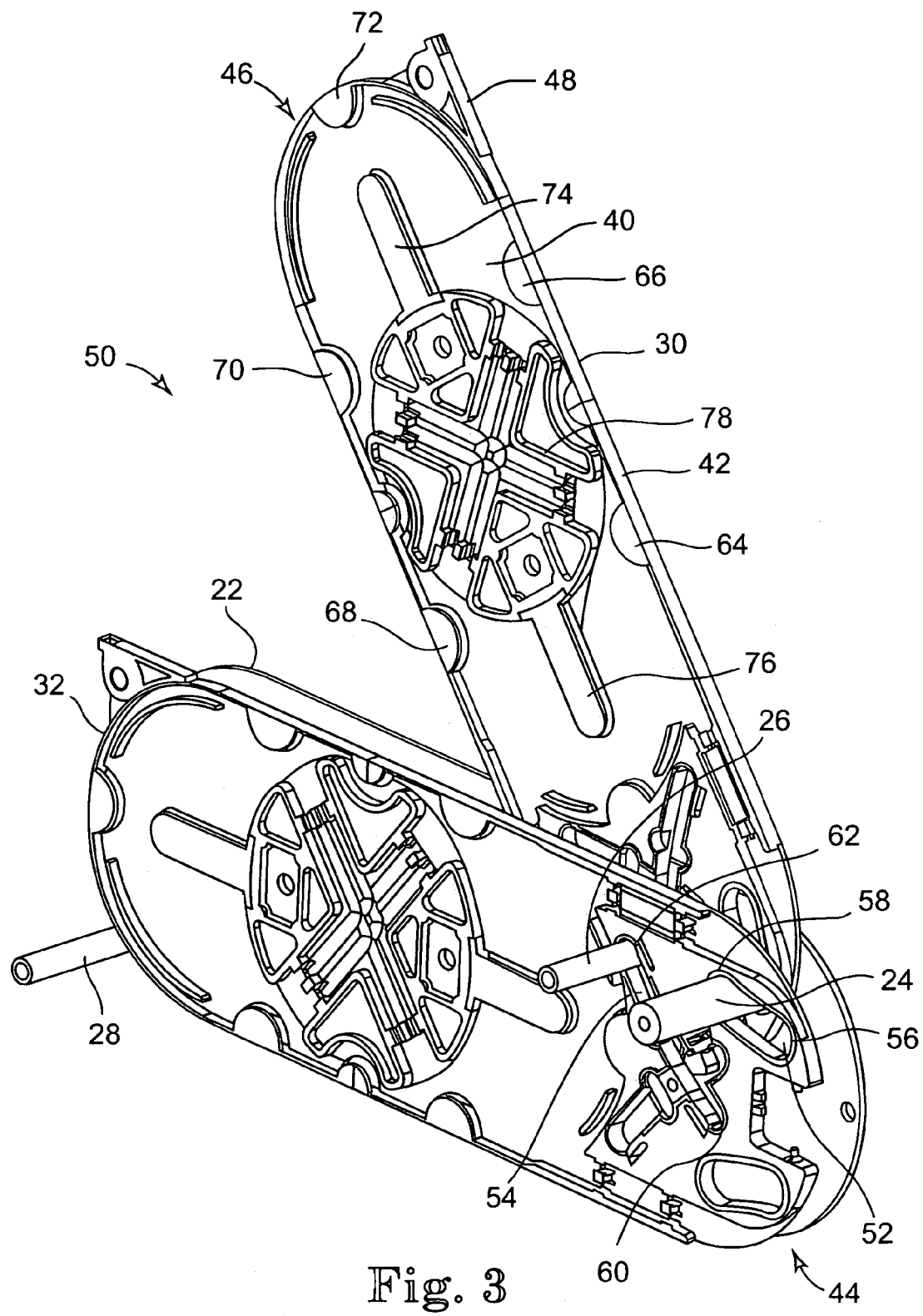
FIG. 3 is a partially assembled array according to the invention showing the movement mechanism for moving an individual cassette.

FIG. 3 shows a portion 50 of the cassette array 10 according to FIGS. 1 and 2. This portion only comprises some of the components and allows a better understanding of the overall construction of this embodiment of the invention. What is shown is cassette 30, which is adjacent to the side plate 22. All other numerals related to the details of the cassettes will remain the same. The configuration further shows the next cassette 32, which is in the closed position. Furthermore, axes 24, 26, 28 can be seen. Side plate 22 is provided with axes 24, 26, 28, which are preferably fixedly mounted onto side plate 22. The cassettes are placed onto the axes through a first curved slot 52 and a second curved slot 54. The cassettes are placed on axes 24, 26 through slots 52, 54 sequentially starting with cassette 30, then 32, and so on. After having the assembly completed with the last cassette 34, the second side plate 20 is placed on to axes 24, 26, 28 and fixedly mounted to it. The side plates can be connected to the axes in any suitable manner, including by snap fit, ultrasonic welding, gluing and the like.

FIG. 3 also illustrates the manner in which way an individual cassette can be moved out of the array to provide access to the fibers. This is achieved through the design of curved slots 52, 54. When looking at cassette 32 it can be seen that curved slot 52 has a right end 56 and a left end 58. Slot 54 has a right end 60 and a left end 62. In the closed position the axes 24, 26 touch or are at least close to the left ends 58, 62 of curved slots 52, 54. When moving a cassette out as it is shown with cassette 30, the axes 24, 26 are guided through the respective slots until these axes touch the right ends 56, 60 of curved slots 52, 54. In order to realize this effect it is necessary to provide a geometrical configuration, which allows an easy movement of the cassette. Although the exact positions and dimensions of the slots may be different for cassettes of different sizes, those and other relevant parameters can be determined by someone skilled in the art, perhaps with the assistance of a computer-aided design program. An important feature is that in this way the cassette 30 is not only rotated around an axis, but simultaneously moved out in a direction, which is perpendicular to the longitudinal direction 36 of cassette 30. This allows a user to access the internal part of the cassette, after the cassette has only been moved at a relatively small angle, which in the illustrated embodiment is on the order of 60° without any movement of fibers inside the cassette. This is so because approximately the same length of fibers is needed for the closed cassette position as with the open cassette positions. In the configuration shown in FIG. 3 the arrangement is such that the cassette is moved at the first longitudinal end 44, utilizing the handle 48. An alternative approach will be referred to below.

Cassette 30 may be injection molded in a single piece, and comprises a base plate 40 and a side wall 42 as described above. It furthermore contains molded-in configurations 64, 66, 68, 70, 72, which project from the upper side of the wall while on the base plate 40 corresponding openings are provided in order to allow a molding of this component without the use of any drawers. These devices provide possibilities to maintain the optical fibers that are guided inside the cassette and to keep them in place. The same applies to the fingers 74, 76 that are provided in the middle and where also in the base plate 40 corresponding openings are left for the same reason. The circular middle portion in the base plate 40 designated with 78 provides locations for affixing the fiber optic splices. This will be referred to in greater detail below in, for example, FIGS. 8 and 9, where the cross-like portion (in this embodiment) helps to affix the splice within the cassette.

Figure 4:
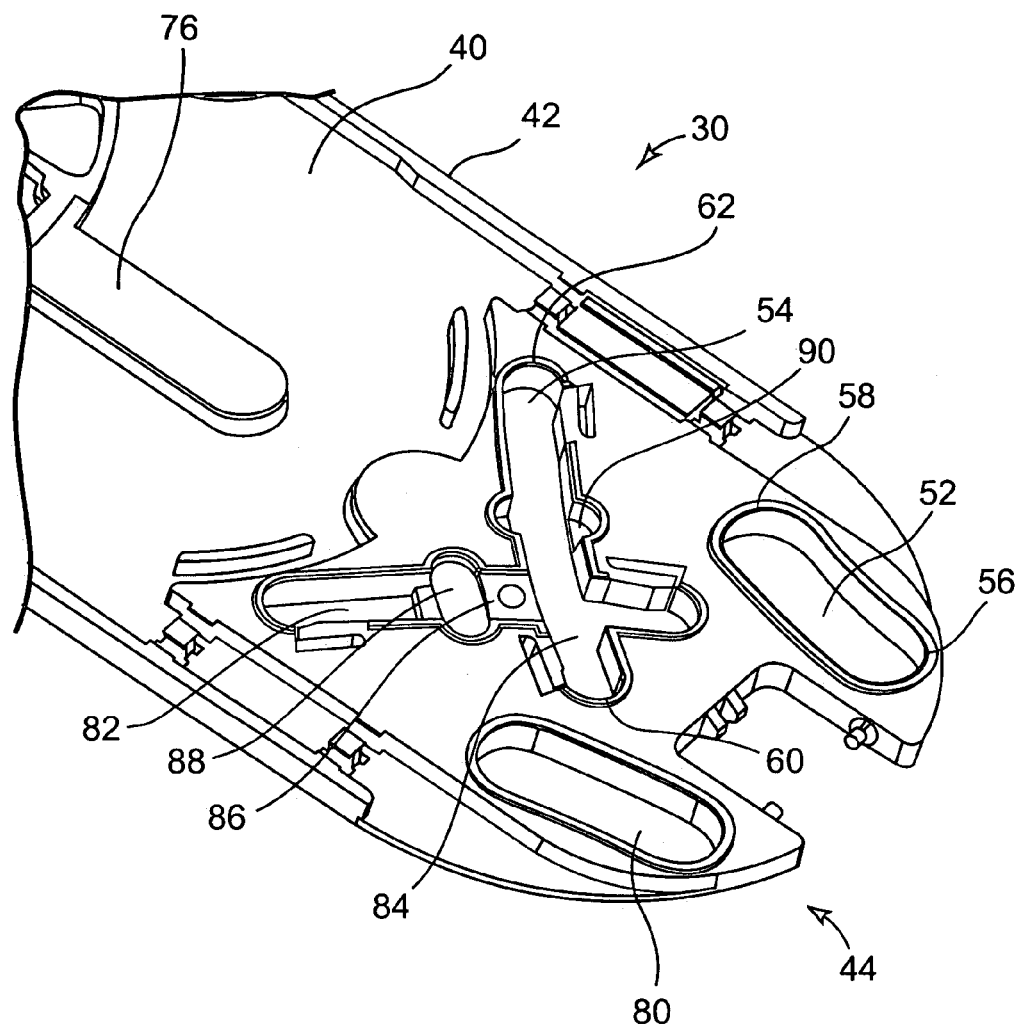
FIG. 4 shows an enlarged view of the first longitudinal end of a cassette with an arrangement of two pairs of curved slots.
Figure 5:
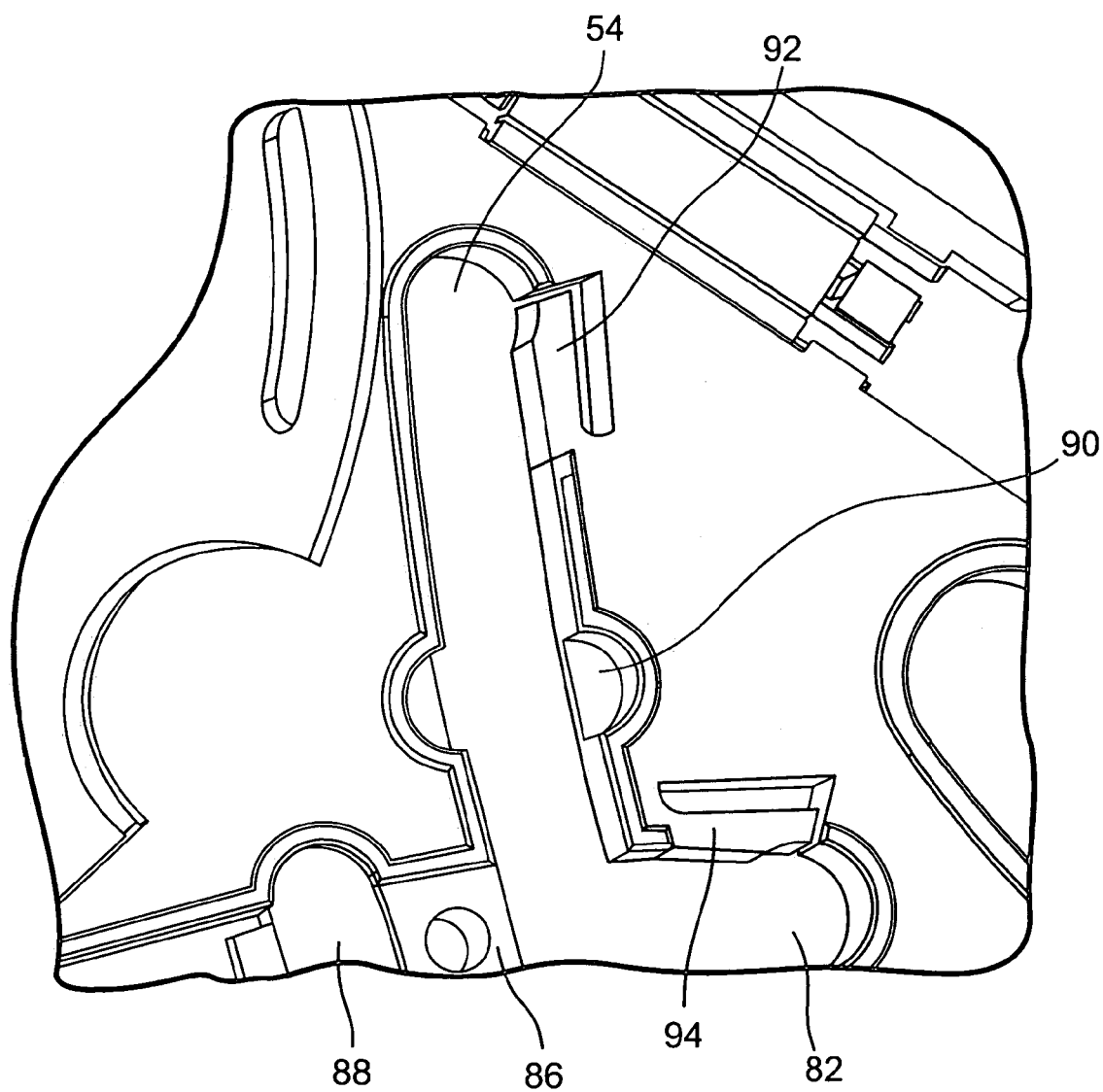
FIG. 5 is a further enlargement of the configuration of FIG. 4 showing the holding mechanism at one end of the second slot.

FIGS. 4 and 5 provide further details of an embodiment of cassette 30. FIG. 4 shows the cassette 30 at its first longitudinal end 44 with base plate 40 and wall 42 and finger 76. Furthermore, the first slot 52 with its ends 56, 58 and second slot 54, with its ends 60, 62 can be seen. Furthermore, a second additional pair of slots 80, 82 can be seen, here the first slot 80 is placed at the opposite side of the base plate 40 and does not interfere with first slot 52 of the first pair. However, due to the overall design second slot 82 of the second pair typically interferes with the second slot 54 of the first pair, and they cross each other at the position 84. The purpose of the second pair of slots will be explained in further detail below. In general, it allows the opening of a cassette in an opposite direction. Going back to FIG. 3 it can be seen that axis 26 is supposed to move through slot 54. The second slot of the second pair 82 would however cause problems at the intersection point 84. Therefore, a blocking component 86 is snapped into the second slot 82 of the second pair, with for example an oval configuration 88, which allows the blocking component to snap in. It can be seen that corresponding provisions 90 are provided in the slots 54, 82, if the opposite slot is to be blocked. The exact configuration of the blocking components can of course be different than those shown in the appended drawings, but in general should prevent the movement of the cassette in a manner that would cause an axis to move through an undesired slot.

FIG. 5 shows a further enlargement of a portion of FIG. 4 essentially presenting further details of slots 54 and 82. The blocking component 86 with its special configuration 88 to fit into the provisions in the slot 90 can be seen in greater detail as well. Particular attention is drawn to the configurations 92, 94 at each end of slots 54, 82, although the same could be provided at only one respective end. Longitudinal openings are provided, so that a small portion is designed, so that it can slightly be moved. The purpose of this configuration is to allow axes 26 to snap into the respective end positions 60, 62 (see FIG. 3). This facilitates the use of the cassette 30, the snap in prevents an unintended movement of the cassette during the handling with the cassette for achieving the desired modifications. It goes without saying that this is only an example for a special design configuration to allow such snap in positions for holding the cassettes in place, both in the closed as well as in the open position. For someone skilled in the art it is possible to identify any other means to achieve the same purpose, including what may be referred to as a detente. Accordingly, the invention is not limited to the design as shown in the FIG. 5.

Figure 6:
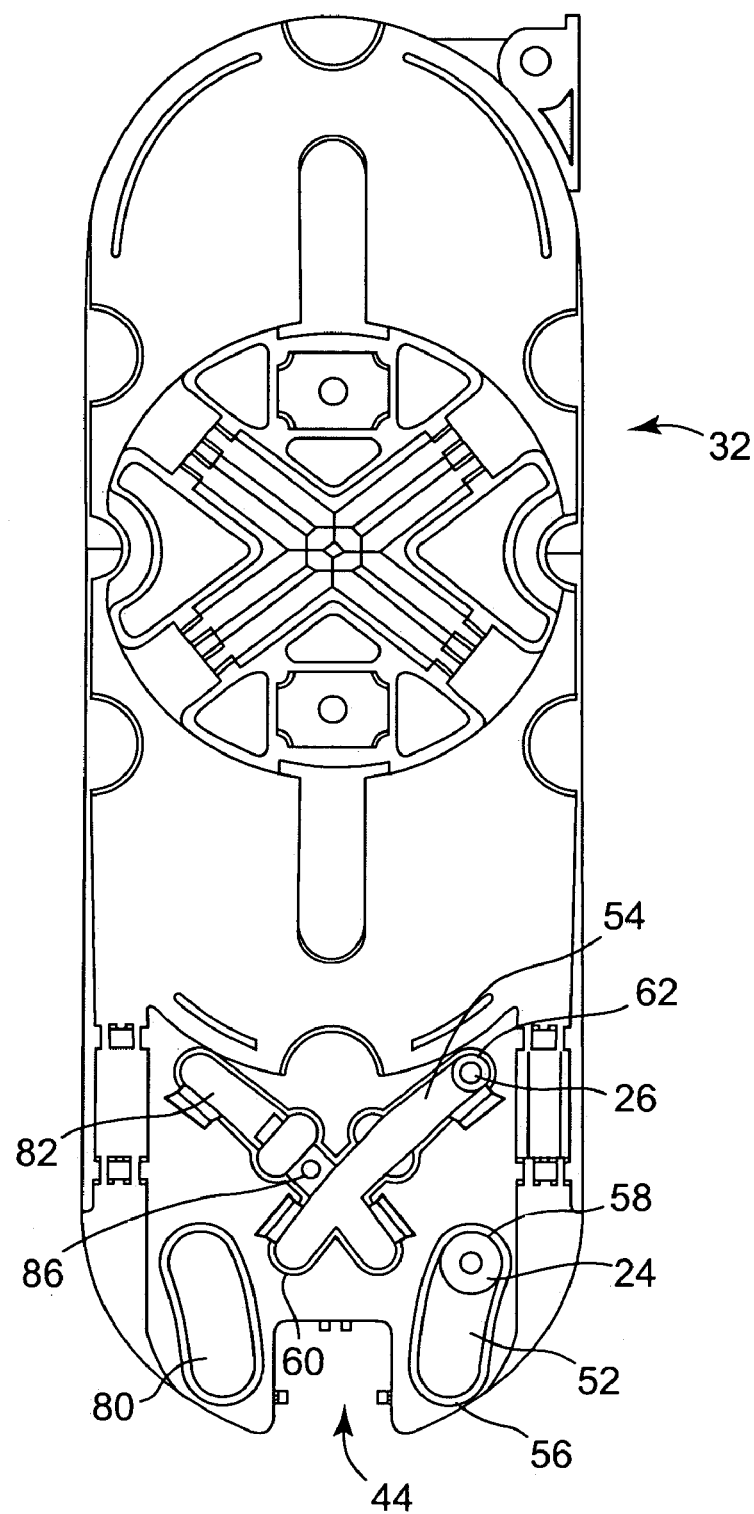
FIG. 6 shows a top view of a cassette according to the invention with an arrangement of two pairs of slots at the first longitudinal end allowing a movement of the cassette to the right side as depicted.
Figure 7:
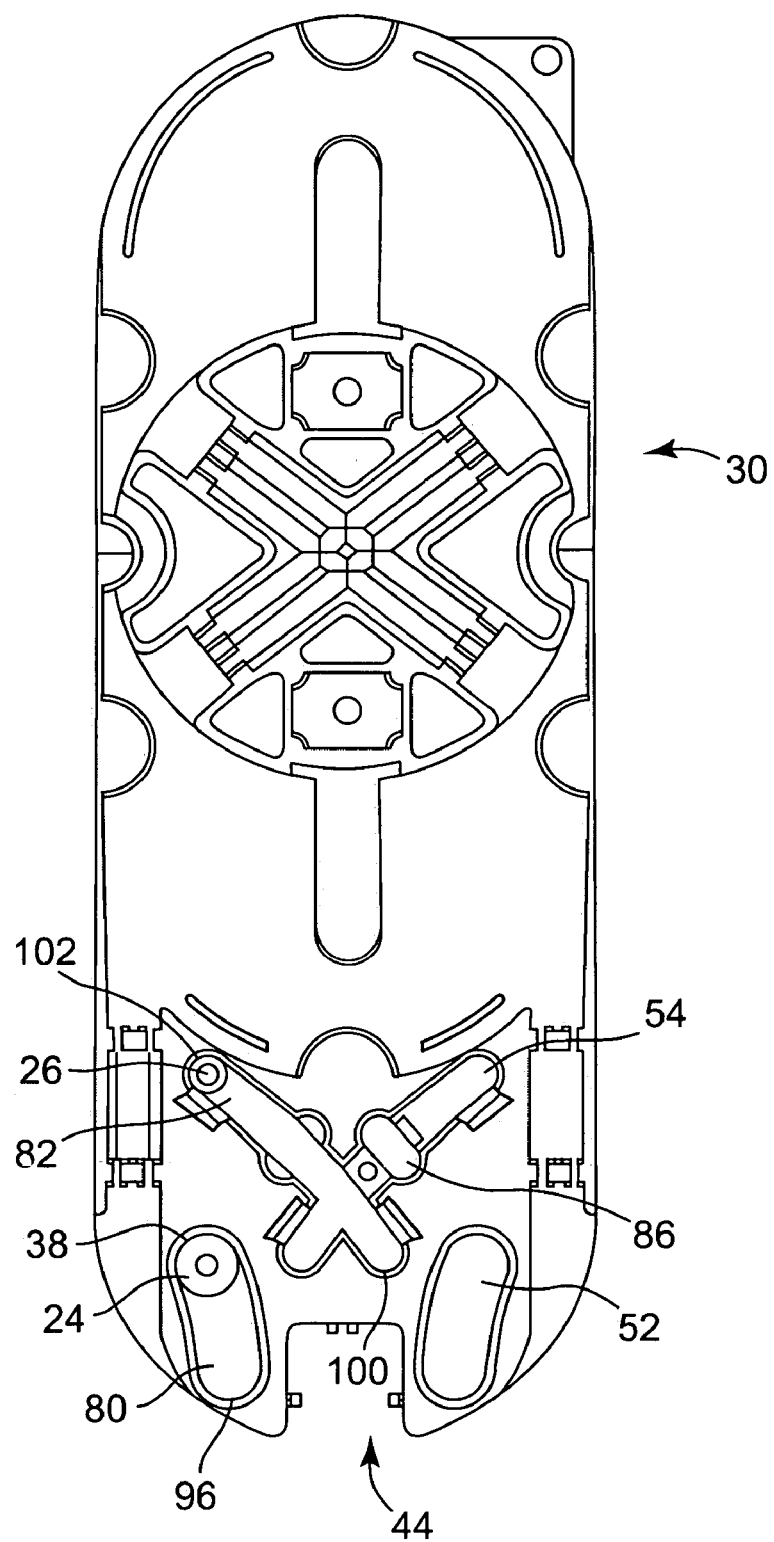
FIG. 7 shows the same cassette however, arranged for a movement to the left side in the shown arrangement.

FIGS. 6 and 7 illustrate in more detail the purpose of the use of a first pair of curved slots 52, 54 and a second pair of curved slots 80, 82. The configuration in FIG. 6 essentially shows the positioning of the cassette and the axes 24, 26 that are supposed to hold cassette 32 as in FIG. 3, mainly in a closed position. Axes 24, 26 touch or at least are close to touching slot 52, 54 at their ends 58, 62 opposite the first longitudinal end 44. The blocking component 86 is arranged in slot 82. When moving cassette 32 out in this direction, it is guided by axes 24, 26, which then pass through slots 52, 54 until they reach the ends 56, 60 close to the first longitudinal end 44. As described above typically the cassettes when they are opened are accessed from the top. It may be desirable to move the cassette out not from the first longitudinal end as shown in FIG. 1 but for whatever reason from the opposite end. In order to avoid the need to mold a second component, the double configuration with the two pairs of slots 52, 54 and 80, 82 allows the use of the very same component for this alternative arrangement where for example the cassette is not moved from the right but from the left side or vice versa. This alternative configuration can be seen in FIG. 7. Here the same kind of cassette, which is then movable from the other side, is guided again through the axes 24, 26, which however move in slots 80, 82. In the closed position they touch or are at least close to touching the ends 98, 102 opposite to the first longitudinal end 44 as shown. In the open position the axes are guided along the slots 80, 82 until they reach the opposite ends 96, 100 close to the first longitudinal end 44 as depicted. The blocking component 86 accordingly is placed into slot 54.

Figure 8:
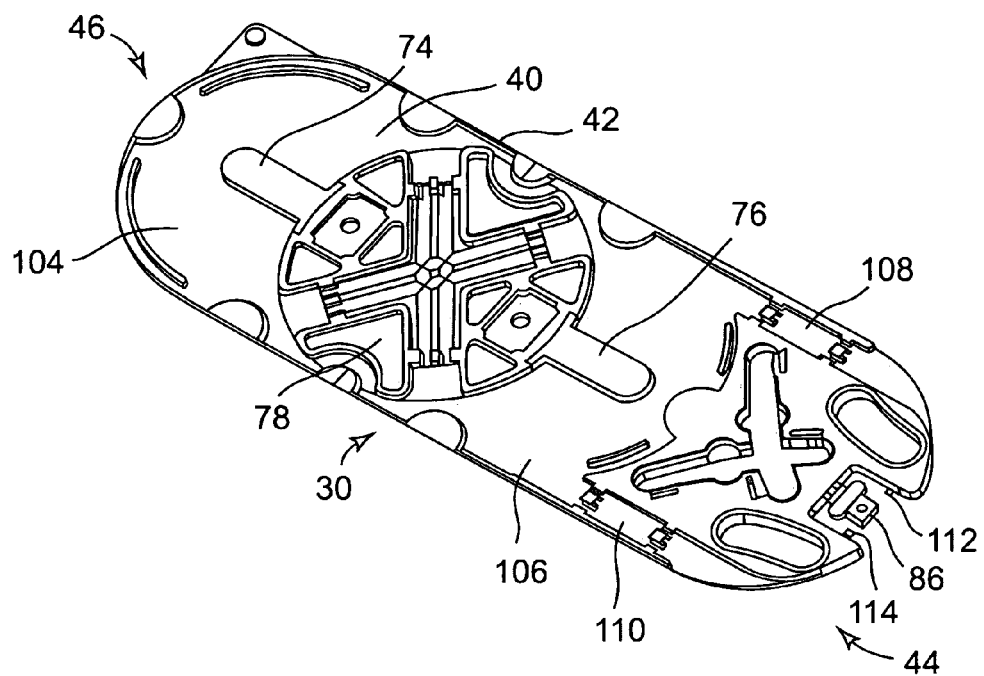
FIG. 8 shows a cassette as obtained through an injection molding process.
Figure 9:
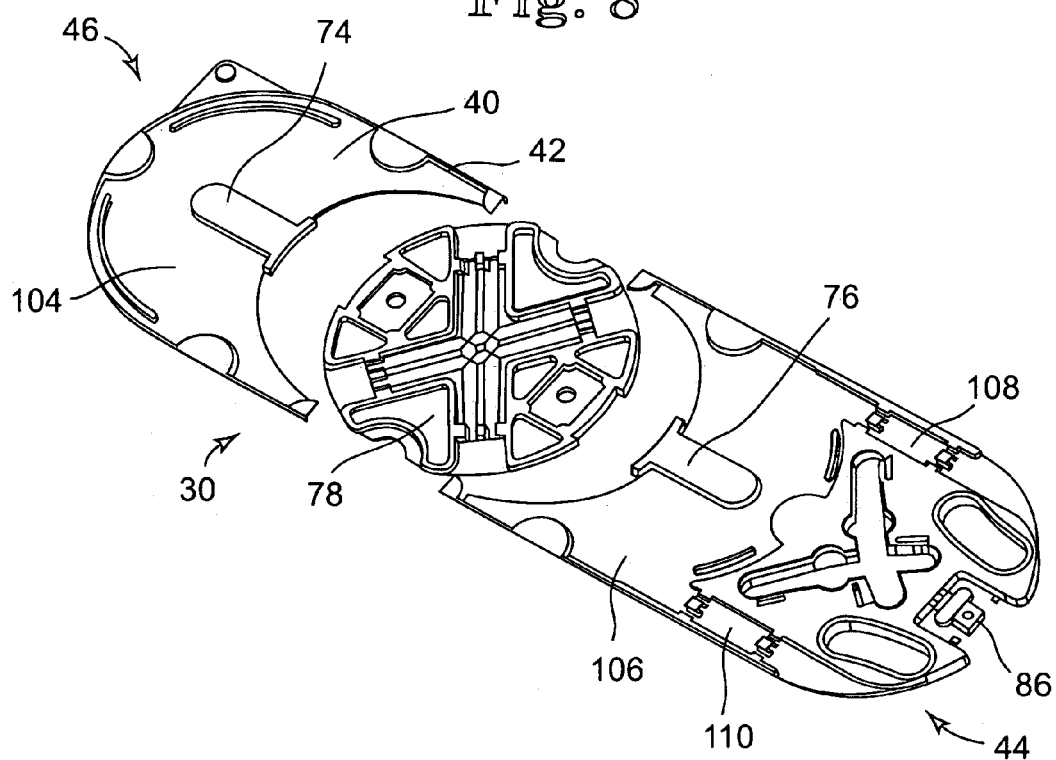
FIG. 9 provides an exploded view of the injection molded part as shown in FIG. 8 showing the result of utilizing different inserts for the molding tool.

FIGS. 8 and 9 show details that are related to a method of manufacturing cassettes 30. These are preferably obtained through injection molding. The advantage of using two pairs of slots is already explained above and will not be referred to in further detail. Middle part 78 is shown in detail in FIGS. 8 and 9, and it holds the fiber optic splices in position. FIGS. 8 and 9 show cassette 30 with its base plate 40, walls 42 and especially the fingers 74, 76 allowing retention of fibers. And the middle portion 78 that should hold the fiber optic splices in place. In both cases it can be seen that in this specific configuration typically two splices can be inserted from two different directions. It is often desired to have a configuration in which the number of splices varies and is for example 4, 6 or even larger. In order to avoid that for each number of splices to be fixed it would be necessary to create a new expensive molding tool, inserts could be made that would simply be replaced in the molding tool. This can be obtained from the comparison of FIGS. 8 and 9. It can be seen that FIG. 9 shows an exploded view with the middle part 78, separated from the other parts at the respective longitudinal ends 44 and 46. There are essentially two ways of generating such a cassette 30. One would be to mold three individual components separately, namely the end parts 104; 106 and the middle part 78, as shown in FIG. 9, which then are joined together through a snap in configuration or eventually combined with any other possibility to fix the parts together such as ultrasonic welding, gluing, or the like. In this case distinctive molding tools would be made and it would be possible to have different molding tools for different central parts 78. An alternative, however, is essentially shown in FIG. 8. It is also possible to only exchange the insert in the corresponding molding tool for the middle portion 78 and for example replace the shown configuration for two splices in each direction by an configuration with four splices in each direction. An insert in a tool is significantly less expensive than a completely new tool. This would allow to simply exchange the insert and mold cassettes with a different number of splice holders. The middle part 78 is provided with two pairs of grooves, which cross each other. The purpose of them can better be seen from FIG. 8. The incoming and outgoing fibers enter cassette 30 on the side, which is next to the two axes (e.g. the right side on FIG. 6). In this case the fibers are passed through the guides 108. One of the fibers is then placed into the groove onto the middle part 78 under configurations 64, 66, 72, 70 (see FIG. 3) so that it is curved around at an angle of more than 180° and in this way the end of the fiber enters the middle part 78 from a direction which is opposite to the direction of the first fiber. The two ends can then be spliced together within the middle part 78 where the grooves allow to fix the splice. Middle part 78 is provided with a second set of grooves at an angle with respect to the first set of grooves as it may be necessary to enter the fibers from the left side as it can be seen on FIG. 8 utilizing the guides 110.

Furthermore, FIGS. 8 and 9 show another detail, which facilitates and reduces the cost in the molding process. It can be seen that the blocking component 86 is molded together with the cassette parts 104, 78, 106 in a manner that it can easily be broken off at the end as shown, when comparing FIGS. 8 and 9 with the other Figures for example 6 and 7 it can be seen that this demonstrates that the corresponding blocking component 86 has been broken off and inserted into the corresponding slots.

Finally, it can be seen that in an addition to the blocking components pins 112, 114 can be created, which would allow a third configuration of the mounting of the cassette 30, namely in the conventional manner where the cassettes are placed side by side and are flipped over like pages in a book. This is of course a less preferred configuration but it can be seen that it would be possible to include this possibility without increasing the cost of the component.

Furthermore, it can be seen on FIGS. 8 and 9 that preferably the incoming and outgoing fibers are guided through guiding means 108, 110 on the side where they pass near by the axes around which the cassette is moved. The total angle of about 60° C. and the closeness of the fibers to these axes ensures a minimum movement of the fibers when opening the cassette while leaving all the other fibers completely untouched.

As described above, an important feature of the present invention is the design of a system in which the length of the fibers required when the cassette is in the closed position is very nearly the same as the length required when the cassette is in an open position, while minimizing the bending angle(s) of the optical fibers. Also, the simultaneous rotational and lateral movement of the cassette is useful, especially when it is done in a controlled manner through a defined path. Depending from need to avoid fiber movement by opening one cassette, only one of the two entries for incoming and also outgoing fibers could be used. However, in the splice area, fibers approach from two sides, which means that the fibers may have to change directions. This is fulfilled by the special position (like a cross) of the structures for affixing the fiber splices, as shown and described in regard to FIGS. 8 and 9. The direction of the structions used to affix or position the fiber splices thus depends on the directions from which the fibers come, and/or the locations at which the fibers enter the cassette. Another advantage of the cassette is the minimized length by incorporating several features into a cassette of reduced size. Another aspect of the invention is the movement of the cassette in two directions as it is opened and closed, due to the two-axis/curved slot arrangement.

What is claimed is:

1. A fiber optic splicing cassette, comprising:
   a base having a width and a length that is larger than the width and a thickness that is smaller than the width; and
   first and second curved slots in said base, wherein said first and second slots are adapted to moveably engage simultaneously with two axes on which said cassette is capable of being mounted such that the base is moveable in a direction which is perpendicular to the longitudinal direction of the cassette and a direction which is perpendicular to the direction of the width of the cassette.

2. The fiber optic splicing cassette of claim 1, wherein said base further includes first and second ends located on opposite sides of a longitudinal axis of said base, and wherein said first slot is arranged towards said first end of said cassette, and wherein said second slot is arranged further inside said cassette.

3. The fiber optic splicing cassette of claim 2, wherein said second slot is longer than said first slot.

4. The fiber optic splicing cassette of claim 1, further comprising third and fourth slots in said base, wherein said third and fourth slots are adapted to moveably engage simultaneously with two axes on which said cassette is capable of being mounted.

5. The fiber optic splicing cassette of claim 4, wherein said base further includes first and second ends located on opposite sides of a longitudinal axis of said base, and where said third slot is arranged towards said first end of said cassette, and wherein said fourth slot is arranged further inside said cassette.

6. The fiber optic splicing cassette of claim 5, wherein said fourth slot is longer than said third slot.

7. The fiber optic splicing cassette of claim 4, wherein said second and fourth slots cross each other.

8. The fiber optic splicing cassette of claim 7, further comprising a removable blocking device provided in one of said second and fourth slots.

9. The fiber optic splicing cassette of claim 1, wherein said second slot comprises a flexible snapping portion at one end thereof.

10. An array of fiber optic splicing cassettes, comprising:
    a plurality of fiber optic splicing cassettes according to claim 1;
    a first side plate; and
    first and second axes extending from said first side plate;
    wherein said optical fiber splicing cassettes are mounted on said axes such that said first slot of each of said cassettes is moveably engaged on said first axis and said second slot of each of said cassettes is moveable engaged on said second axis, such that simultaneously moving the first and second slots relative to said engaged first and second axes rotates said cassettes.

11. The array of fiber optic splicing cassettes of claim 10, wherein said base of each of said cassettes further includes first and second ends located on opposite sides of a longitudinal axis of said base, and wherein said first slot is arranged towards said first end of said cassette, and wherein said second slot is arranged further inside said cassette.

12. The array of fiber optic splicing cassettes of claim 11, wherein each of said cassettes is movable between a closed position and an open position.

13. The array of fiber optic splicing cassettes of claim 12, wherein said cassette rotates in the plane of its base by no more than 90 degrees when moved between said open and closed positions.

14. The array of fiber optic splicing cassettes of claim 13, wherein said cassette simultaneously rotates and lifts from said may when moved from said closed position to said open position.

15. The array of fiber optic splicing cassettes of claim 14, wherein each of said cassettes further comprises third and fourth slots in said base, wherein cassettes may be mounted in either a first arrangement in which said first and second slots are moveably engaged with said first and second axes, respectively, or a second arrangement in which said third and fourth slots are moveably engaged with said first and second axes, respectively.

16. An army of fiber optic splicing cassettes, comprising:
    first and second side plates, wherein said side plates are connected to one another by first and second axes; and
    a plurality of fiber optic splicing cassettes, each of said cassettes including a base and first and second curved slots in said base;
    wherein each of said first slots is moveably engaged on said first axis, and each of said second slots is moveably engaged on said second axis; such that each of said cassettes may be moved between an open position and a closed position by simultaneously moving the first and second slots in one of said cassettes relative to said first and second axes.

17. The array of fiber optic cassettes of claim 16, wherein said slots are configured such that said cassette rotates in the plane of its base no more than 90 degrees when moved between said closed and open positions.

18. The array of fiber optic cassettes of claim 17, wherein said cassette simultaneously rotates and lifts from said array when moved from said closed position to said open position.

19. An array of fiber optic splicing cassettes, comprising:
first and second side plates, wherein said side plates are connected to one another by first and second axes; and
a plurality of fiber optic splicing cassettes mounted in said array, each of said cassettes including a base, wherein each of said bases includes first, second, third, and fourth curved slots;
wherein each of said cassettes is mountable in said array in either
  (i) a first arrangement, in which said first slot is moveably engaged with said first axis and said second slot is moveably engaged with said second axis, such that said cassette is moveable in a first direction from a closed position to a first open position; or
  (ii) a second arrangement, in which said third slot is moveably engaged with said first axis and said fourth slot is moveably engaged with said second axis, such that said cassette is moveable in a second direction from said closed position to a second open position.

20. The array of fiber optic splicing cassettes of claim 19, further comprising a blocking device, wherein said blocking device is removably mounted in said fourth slot when said cassette is mounted in said first arrangement, and wherein said blocking device is removably mounted in said second slot when said cassette is mounted in said first arrangement.

* * * * *

UNITED STATES PATENT AND TRADEMARK OFFICE
CERTIFICATE OF CORRECTION

PATENT NO. : 7,110,654 B2 Page 1 of 1
APPLICATION NO. : 10/682272
DATED : September 19, 2006
INVENTOR(S) : Michel Louis Romain Dillat It is certified that error appears in the above-identified patent and that said Letters Patent is hereby corrected as shown below:

Column 2,
Line 66, delete the word "provide" and insert --provided-- therefor.

Column 5,
Line 49, delete the phrase "that is" and insert --that it is-- therefor.

Column 8,
Line 29, delete the word "an" and insert --a-- therefor.

Column 9,
Line 24, delete the word "structions" and insert --structures-- therefor.

Claim 10, Column 10,
Line 15, delete the word "moveable" and insert --moveably-- therefor.

Claim 14, Column 10,
Line 34, delete the phrase "said may when" and insert --said array when-- therefor.

Claim 16, Column 10,
Line 44, delete the word "army" and insert --array-- therefor.

Signed and Sealed this

Sixth Day of May, 2008

JON W. DUDAS
*Director of the United States Patent and Trademark Office*